(12) United States Patent
Kim et al.

(10) Patent No.: US 8,184,581 B2
(45) Date of Patent: May 22, 2012

(54) METHOD AND APPARATUS FOR TRANSMITTING AND RECEIVING CONTROL INFORMATION AND PACKET DATA IN DOWNLINK

(75) Inventors: Tae-Joong Kim, Seongnam (KR); Gi-Yoon Park, Daejeon (KR); Ok-Sun Park, Daejeon (KR); Jae-Kyung Lee, Daejeon (KR); Hyeong-Jun Park, Daejeon (KR); Seung-Chan Bang, Daejeon (KR)

(73) Assignees: Electronics and Telecommunications Research Institute, Daejeon (KR); Samsung Electronics Co., Ltd., Suwon-Si, Gyeonggi-Do (KR)

( * ) Notice: Subject to any disclaimer, the term of this patent is extended or adjusted under 35 U.S.C. 154(b) by 644 days.

(21) Appl. No.: 12/434,302

(22) Filed: May 1, 2009

(65) Prior Publication Data

US 2009/0268670 A1    Oct. 29, 2009

Related U.S. Application Data

(63) Continuation of application No. PCT/KR2007/005458, filed on Oct. 31, 2007.

(30) Foreign Application Priority Data

Nov. 1, 2006 (KR) .................. 10-2006-0107492
Oct. 9, 2007 (KR) .................. 10-2007-0101624

(51) Int. Cl.
*H04W 4/00* (2009.01)
(52) U.S. Cl. ......... 370/329; 370/342; 370/345; 370/535
(58) Field of Classification Search ............... 370/328, 370/329, 342, 469, 535, 536, 537
See application file for complete search history.

(56) References Cited

U.S. PATENT DOCUMENTS 7,023,834 B1    4/2006    Radimirsch
(Continued)

FOREIGN PATENT DOCUMENTS

WO    WO-2008/054147 A1    5/2008

OTHER PUBLICATIONS

International Search Report for Application No. PCT/KR2007/005458, dated Feb. 12, 2008.

*Primary Examiner* — Hassan Kizou
*Assistant Examiner* — Toan Nguyen
(74) *Attorney, Agent, or Firm* — Nelson Mullins Riley & Scarborough LLP; EuiHoon Lee, Esq.

(57) ABSTRACT

Provided are a method and apparatus for transmitting control information and packet data. The method includes generating control channels which transmit the control information; generating control indication channel which indicates whether the control channels are transmitted or not; generating data channels in order to transmit the packet data based on the control information; multiplexing the control channels, the control indication channels, and the data channels; and transmitting the control channels, the control indication channels, and the data channels. According to the present invention, when control information and packet data are transmitted in downlink, by transmitting additional information indicating whether control channels are transmitted or not, resources not actually allocated to control channels can be allocated to data channel and the mobile station can receive data channel using the control indication information.

24 Claims, 9 Drawing Sheets

U.S. PATENT DOCUMENTS

| | | |
|---|---|---|
| 7,031,249 B2 | 4/2006 | Kowalski |
| 2001/0047268 A1 | 11/2001 | Kawai et al. |
| 2002/0145985 A1 | 10/2002 | Love et al. |
| 2003/0099255 A1* | 5/2003 | Kekki et al. .................... 370/469 |
| 2003/0123470 A1 | 7/2003 | Kim et al. |
| 2003/0202500 A1* | 10/2003 | Ha et al. ......................... 370/342 |
| 2005/0128973 A1 | 6/2005 | Yagihashi |
| 2006/0035594 A1 | 2/2006 | Murata et al. |
| 2006/0077923 A1* | 4/2006 | Niwano ......................... 370/328 |
| 2006/0193290 A1* | 8/2006 | Suzuki et al. ................. 370/329 |
| 2009/0207788 A1* | 8/2009 | Abeta et al. ................... 370/329 |

\* cited by examiner

METHOD AND APPARATUS FOR TRANSMITTING AND RECEIVING CONTROL INFORMATION AND PACKET DATA IN DOWNLINK

RELATED APPLICATIONS

This application is a continuation of International Application No. PCT/KR2007/005458, filed on Oct. 31, 2007, which claims priority to, and benefit of, Korean Patent Application No. 10-2006-0107492, filed on Nov. 1, 2006 and Korean Patent Application No. 10-2007-0101624, filed on Oct. 9, 2007. The contents of the aforementioned applications are hereby incorporated by reference.

TECHNICAL FIELD

The present invention relates to a method and apparatus for transmitting control information and packet data in a communication system, and more particularly, to a method and apparatus for transmitting control information and packet data over downlink in a communication system, and an efficient method and apparatus for receiving the control information and the packet data.

The present invention was supported by the Information Technology (IT) Research & Development (R&D) program of the Ministry of Information and Communication (MIC) and the Institute for Information Technology Advancement (IITA) [Project No.: 2005-S-404-13, Third Generation (3G) Evolution Wireless Transmission Technology Development].

BACKGROUND ART

Since third generation (3G) mobile communication technology was developed, packet data services have been greatly in demand. In particular, the packet data has a very large variation in data rate and has a very large data rate in comparison with conventional data. Thus, the demands for efficiently transmitting the packet data have highly increased.

To meet such demands, orthogonal frequency-division multiplexing (OFDM) technology transmits data by dividing a frequency band into a plurality of sub-carrier frequencies and allocating the appropriate number of data bits for sub-carriers. As such, the data rate is improved by dividing temporally sequential data into certain temporal units, converting the temporal units to be parallel to each other, and transmitting a subcarrier which is carrying each of the temporal units. Furthermore, temporal discontinuity may be achieved by transmitting sequential data in parallel and thus efficient scheduling may be obtained in the packet data having a very large variation in data rate.

Meanwhile, in a communication system, the data rate and the variation in data rate are variably changed. Thus, allocating fixed resources is very inefficient in view of transmission efficiency. Accordingly, the transmission efficiency may be improved by variably changing the data rate of the packet data in accordance with the amount of data to be transmitted or the state of a channel medium for communication. However, although the above-described method of variably changing the data rate may improve the transmission efficiency, control information of variably changing data has to be informed whenever the data is changed. Therefore, an efficient method of transmitting variably changing control information is required.

Conventionally, the packet data is transmitted in a downlink by using a high-speed downlink packet access (HSDPA) method referred to as a third generation partnership project 2 (3GPP2) 1x evolution-data optimized (1xEV-DO) method or a third generation partnership project (3GPP) release-5 method, and a mobile worldwide interoperability for microwave access (WIMAX) method referred to as a wireless broadband (WiBRO) method in accordance with the Institute of Electrical and Electronics Engineers (IEEE) 802.16e.

In the 3GPP2 1xEV-DO method, by transmitting data rate control (DRC) information together with packet data to a temporal slot designated as a downlink, information regarding the packet data in the downlink is transferred. A mobile station receives the DRC information and thus may correctly receive the packet data by checking the information regarding the packet data.

In the HSDPA method, the transmission efficiency is improved by transmitting the packet data with a certain time interval after transmitting information regarding a modulation method, an allocated orthogonal variable spreading factor (OVSF) channel, the data rate of the packet data in a downlink through high speed-shared control channels (HS-SCCHs). Here, the HS-SCCHs are common channels to be checked by all mobile stations and the number of channels is fixed to be four. The mobile stations check whether corresponding control information is transmitted through the four HS-SCCHs.

DETAILED DESCRIPTION OF THE INVENTION

Technical Problem

Figure 1:
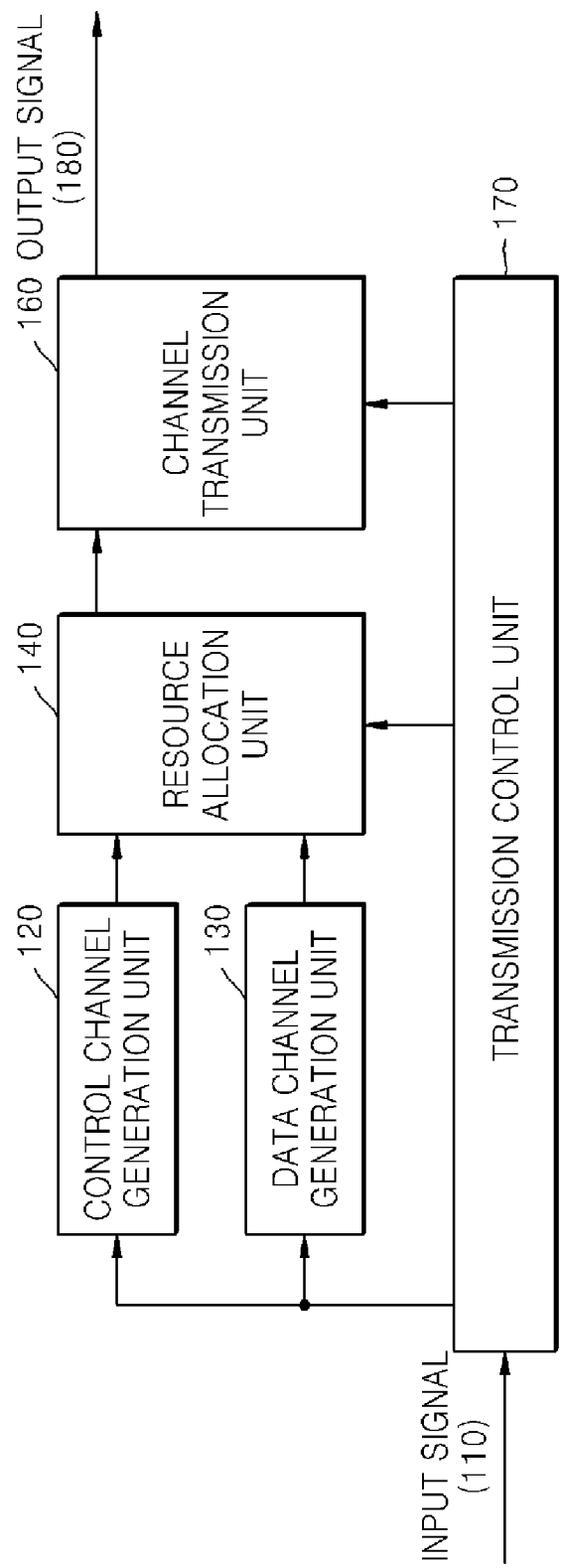
FIG. 1 is a block diagram of an apparatus for transmitting control information and packet data in a downlink, according to a conventional control channel transmission method.

When control information is transmitted by using a high-speed downlink packet access (HSDPA) method, a plurality of physical channels may be set as high speed-shared control channels (HS-SCCHs) and the channels can't be used as data channels. Thus, as control information increases, the number of physical channels for HS-SCCHs increases accordingly. Such increase of the number of HS-SCCHs brings about low efficiency in the data rate.

In the HSDPA method, the HS-SCCHs and the data channels may obtain orthogonality due to an allocated orthogonal variable spreading factor (OVSF) by using a code division multiple access (CDMA) method so that data may not be affected. However, if control information and data are temporally separated by using a time division multiple access (TDMA) method or an orthogonal frequency-division multiplexing (OFDM) method instead of the CDMA method, resources for transmitting the data can be irregularly changed depending on whether the control information is transmitted or not and thus the transmission method becomes very complicated.

Technical Solution

The present invention provides a method and apparatus in which resources for transmitting control information for data transmission in downlink may be used for transmitting data when the control information to be transmitted does not exist, by additionally transmitting control indication information that indicates whether the control information to be transmitted exists or not.

The present invention also provides a method and apparatus in which a mobile station may efficiently receive control information by receiving additional information indicating whether the control information is to be transmitted or not and the mobile station may have a simple configuration for receiving data.

Advantageous Effects

According to the present invention, when control information and packet data are transmitted in downlink, the number of control channels to be detected may be reduced in advance by notifying whether the control channels are transmitted or not by control indication channel. Furthermore, transmission resources may be efficiently used and thus a data rate may be improved.

Best Mode

According to an aspect of the present invention, there is provided a method of transmitting control information and packet data, the method including (a) generating control channels which contain the control information; (b) generating control indication channel which indicates whether the control channels are transmitted or not; (c) generating data channels in order to transmit the packet data based on the control information; (d) multiplexing the control channels, the control indication channel, and the data channels; and (e) transmitting the control channels, the control indication channel, and the data channels.

According to another aspect of the present invention, there is provided an apparatus for transmitting control information and packet data, the apparatus including a control channel generation unit for generating control channels which contain the control information; a control indication channel generation unit for generating control indication channel which indicates whether the control channels are transmitted or not; a data channel generation unit for generating data channels; a multiplexing unit for receiving channel signals of the control channels, the control indication channel, and the data channels and multiplexing the channel signals; a channel transmission unit for receiving the multiplexed channel signals and outputting the multiplexed channel signals as an output signal; and a transmission control unit for receiving a control signal from an external device and controlling the control channel generation unit, the control indication channel generation unit, the data channel generation unit, the multiplexing unit, and the channel transmission unit.

According to another aspect of the present invention, there is provided a method of receiving control information and packet data, the method including (a) separating corresponding channel information from resources designated for one or more channels by demultiplexing the channel information; (b) receiving control indication channel in accordance with the result of demultiplexing; (c) receiving control channels by using information of the received control indication channel; and (d) receiving data channels by using information of the received control indication channel and control channels.

Mode of the Invention

Hereinafter, the present invention will be described in detail by explaining embodiments of the invention with reference to the attached drawings.

In the following description of the present invention, a detailed description of known functions and configurations incorporated herein will be omitted when it may make the subject matter of the present invention unclear.

In the following description, well-known functions or elements are not described in detail since they would obscure the invention in unnecessary detail. The meaning of terminology used herein should be interpreted in consideration of the context of the present invention, and may vary depending on the user's or operator's intention, or customs in the art. Therefore, all meaning should be determined with reference to the entire specification.

However, when publicly known techniques or structures related to the present invention may unnecessarily complicate the present invention, the detailed description thereof will be omitted. The terms used in the specification are defined in consideration of functions used in the present invention, and can be changed according to the intent or conventional use methods of clients, operators, and users. Accordingly, definitions of the terms should be understood on the basis of the entire description of the present specification. In the drawings, like reference numbers denote like structural elements.

According to a conventional control channel transmission method, control channels and data channels are transmitted and the control channels provide information regarding the data channels.

FIG. 1 is a block diagram of an apparatus for transmitting control information and packet data in downlink, according to the conventional control channel transmission method.

Referring to FIG. 1, when an external input signal 110 is received, a transmission control unit 170 processes various control signals and data signals. A control channel generation unit 120 generates control channels and a data channel generation unit 130 generates data channels using the external input signal.

A resource allocation unit 140 allocates fixed resources to the generated control and data channels, and the control and data channels are transmitted by a channel transmission unit 160 as an output signal 180.

However, according to the conventional control channel transmission method described above, fixed resources are allocated to the control channels and data channels, thus resources fixed to the control channels can't be allocated to the data channels even if control channels are not transmitted and the resources are available.

Figure 2:
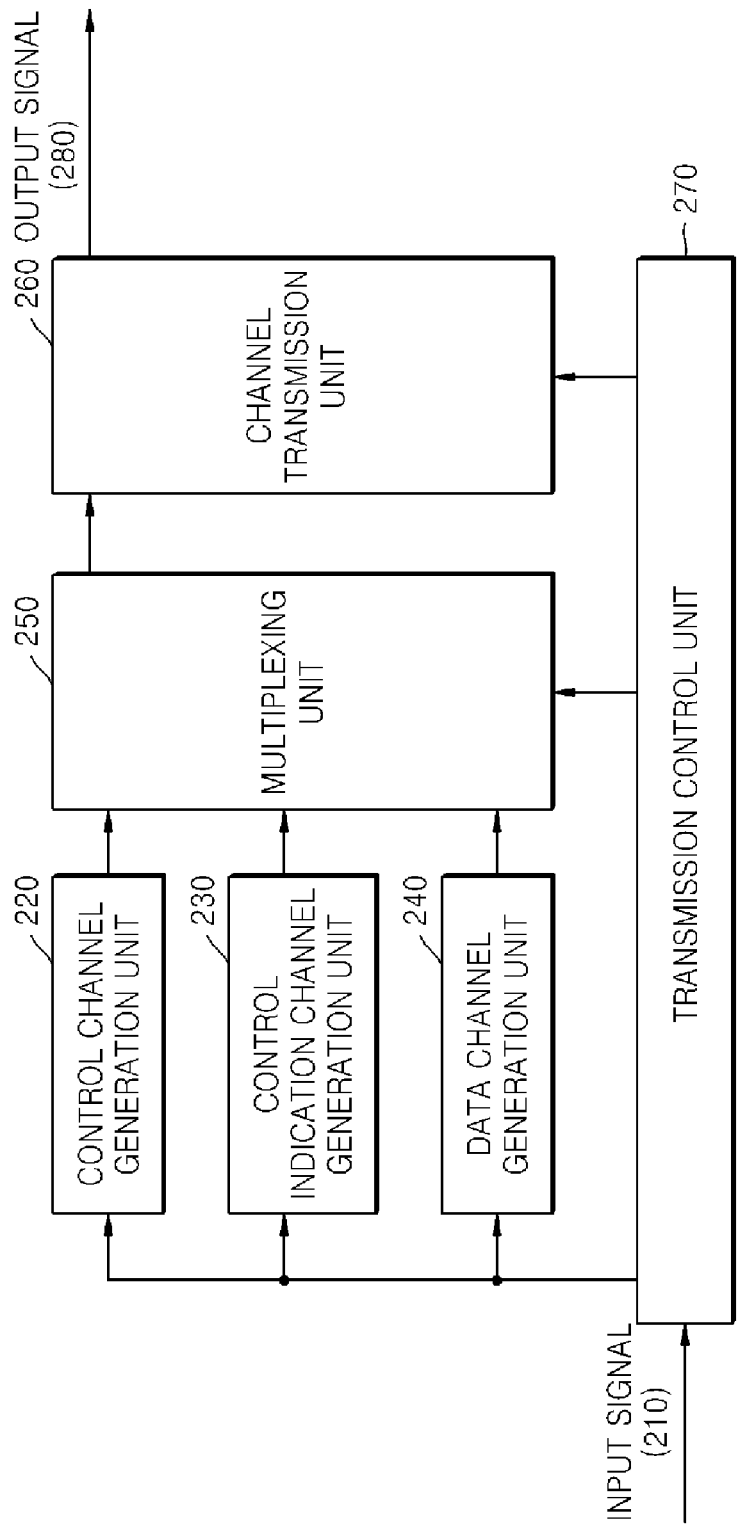
FIG. 2 is a block diagram of an apparatus for transmitting control information and packet data in a downlink, according to an embodiment of the present invention.

FIG. 2 is a block diagram of an apparatus for transmitting control information and packet data in downlink, according to an embodiment of the present invention.

Referring to FIG. 2, the apparatus includes a transmission control unit 270 for receiving an input signal 210 in order to control transmission of the packet data by using internal control signals, a control channel generation unit 220 for generating control channels that contain control information of the packet data by the control of the transmission control unit 270, a control indication channel generation unit 230 for generating control indication channel that indicates whether the control channels are to be transmitted or not by the control of the transmission control unit 270, a data channel generation unit 240 for generating data channels by the control of the transmission control unit 270, a multiplexing unit 250 for efficiently multiplexing the channels by the control of the transmission control unit 270 after receiving the control channels, the control indication channel, and the data channels, and additional channels to be transmitted and a channel transmission unit 260 for outputting the multiplexed channels as an output signal 280 by the control of the transmission control unit 270.

In FIG. 2, for convenience of explanation, only the control channels, the control indication channel, and the data channels will be described in detail and a detailed description of the additional channels and the input signal 210 will be omitted.

The control channel generation unit 220 performs a function of transmitting control information of the data channels to be transmitted. In this case, the control channels are not transmitted when the control information does not exist. When there is no control information, the control channels are not transmitted.

Meanwhile, the control indication channel generation unit 230 generates binary information, which is 'ACTIVE' when the control channels are generated and 'INACTIVE' when the control channels are not generated by the control channel generation unit 220 respectively.

For example, from among N control channels, if control channels 0 and 1 are transmitted and control channels 2 through N−1 are not transmitted, control indications corresponding to the control channels 0 and 1 are set to 'ACTIVE' and control indications corresponding to the control channels 2 through N−1 are set to 'INACTIVE'. Here, the 'ACTIVE' and 'INACTIVE' signals may be defined in different ways, for example, the 'ACTIVE' and 'INACTIVE' signals may be simply identified to be '1' and '−1', respectively.

The data channel generation unit 240 encodes and converts the packet data to be transmitted into a format that can be multiplexed by the multiplexing unit 250.

The multiplexing unit 250 multiplexes the control channels, the control indication channel, and the data channels to resources to transmission resources.

When the multiplexing unit 250 multiplexes the control channels, the control indication channel, and the data channels, two following methods are used to prevent the resources from being overlapped.

As a first method, the data channel generation unit 240 checks if the resources are overlapped. If the resources are overlapped, the data channel generation unit 240 calculates the amount of overlapped resources in advance and generates the reduced number of data in accordance with the calculation above. Then, the generated data is actually mapped to the resources of the data channels, which are designated by the multiplexing unit 140.

As a second method, data is generated by using the amount of resources corresponding to data allocated to the data channels (for example, in the case of data channel 0, $K_{D1} \times (T_1 + T_2)$), the data is primarily allocated to the resources. Then, the control channels and the control indication channel are allocated so that the control channels and the control indication channel puncture allocated data to overlapped resources.

The data multiplexed by the multiplexing unit 250 is generated as the output signal 280 by the channel transmission unit 260.

The control channels, the control indication channel, and the data channels, which are transmitted as described above, are restored by a mobile station, and thus, the packet data is completely transmitted.

Figure 3:
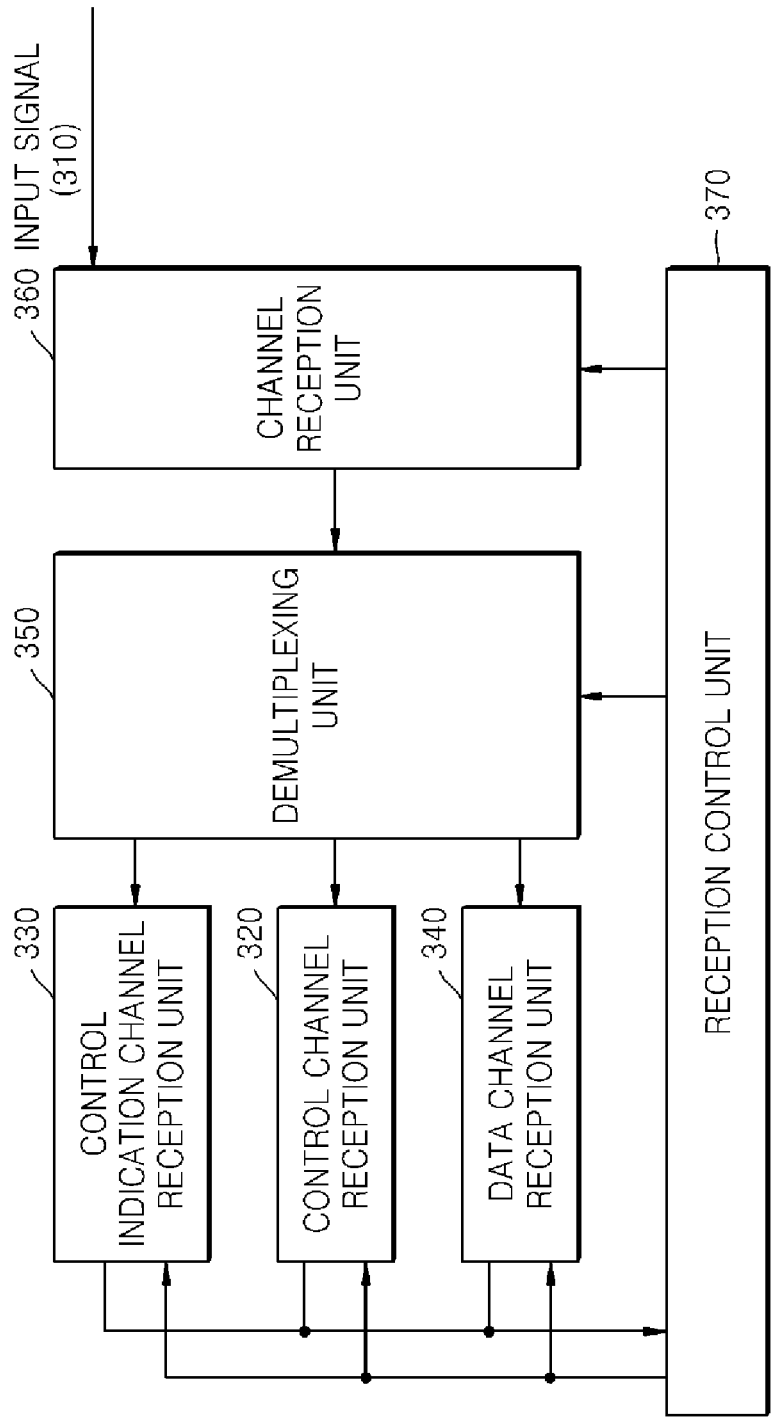
FIG. 3 is a block diagram of an apparatus for receiving control information and packet data, and which is included in a mobile station, according to an embodiment of the present invention.

FIG. 3 is a block diagram of an apparatus for receiving control information and packet data, and which is included in a mobile station, according to an embodiment of the present invention.

Referring to FIG. 3, the apparatus includes a reception control unit 370 for controlling the apparatus, a channel reception unit 360 for receiving an input signal of the mobile station and processing received channel signals, a demultiplexing unit 350 for separating a plurality of received channels, a control indication channel reception unit 330 for receiving signals corresponding to channel indication channel signals from the demultiplexed channel signals, detecting control indication information bits, and checking which control channels are transmitted, a control channel reception unit 320 for receiving control channels which are corresponding to the mobile station and set to 'ACTIVE' by using control indication information bits obtained from the control indication channel reception unit 330, and a data channel reception unit 340 for receiving data channels by using control information, which is detected by the control channel reception unit 320.

First, the channel reception unit 360 is a module that can be changed in accordance with an applied transmission method and performs inverse functions corresponding to the functions of the channel transmission units 160 and 260 illustrated in FIGS. 1 and 2.

For example, if the channel transmission units 160 and 260 perform inverse fast Fourier transformation (IFFT) for orthogonal frequency-division multiplexing (OFDM), the channel reception unit 360 performs fast Fourier transformation (FFT).

Since the signal outputs from the channel reception unit 360 are multiplexed from control channels, control indication channel, and data channels, the signals has to be demultiplexed by the demultiplexing unit 350.

Here, as pre-defined resources are allocated to the control indication channel, the control indication information is demultiplexed using the pre-defined resources information.

Furthermore, the control channels are also demultiplexed by using signals corresponding to the resources allocated to the control channels regardless of the fact of whether the control channels are transmitted or not.

In order to check whether the control channels are transmitted or not, the control indication channels have to be detected in advance. Thus, the data channels are demultiplexed by assuming that all control channels are not transmitted ('INACTIVE'). The demultiplexed channel signals are transmitted to the control indication channel reception unit 330, the control channel reception unit 320, and the data channel reception unit 340, respectively.

The control indication channel reception unit 330 performs detection on all available N control indication information bits and determines whether each control channel is transmitted ('ACTIVE') or not ('INACTIVE'). Information regarding the determination results may be transferred to the control channel reception unit 320 through the reception control unit 370 or be directly transferred from the control indication channel reception unit 330 to the control channel reception unit 320.

After checking whether each control channel is transmitted or not, the control channel reception unit 320 attempts to receive control channels set to be 'ACTIVE'. In this case, the control channel reception unit 320 detects control channels matching with the identity of the current mobile station. That is, control channels that are set to be 'ACTIVE' and match with the identity of the current mobile station are detected. The control information obtained from the detection may also be informed from the control channel reception unit 320 to the data channel reception unit 340 through the reception control unit 370 or be directly transferred from the control channel reception unit 320 to the data channel reception unit 340.

The data channel reception unit 340 receives the control information from the control channel reception unit 320 and determines resources corresponding to the control information from the demultiplexed channels.

Here, the result obtained from the control indication channel reception unit 330 is used. That is, control indication information bits received from the control indication channel reception unit 330 indicates whether each of the control channels is transmitted or not and thus it is possible to identify resources that are not transmitted due to the transmission of control channels and resources that are actually transmitted due to the non-transmission of control channels among the resources of the data channels.

Here, the resources of the transmitted control channels and the of the data channels corresponding to the control channels may be different, control channels for another mobile station (the control channels will not be detected because of mismatching to identity) may be overlapped with the data channels for the mobile station in question. Accordingly, the data channel reception unit 340 receives the data channels by re-extracting accurate data resources by using the control indication information for all control channels obtained from the control indication channel reception unit 330.

Thus, a method of configuring re-extracted data channels has to be changed in accordance with a transmission method. That is, when a base station multiplexes control channels and data channels, if the number of resources allocated to the data channels is calculated in advance and the data channels are generated so as to correspond to the calculated number of resources, received data is re-extracted for resources of only data channels which are not overlapped with the control channels.

However, if the base station generates the data channels in accordance with a fixed number of resources regardless of a fact of whether the control channels are transmitted or not, received data is re-extracted in accordance with the number of the transmitted resources. In this case, data channels overlapped with the control channels are punctured by the control channels and thus are not actually transmitted. Data corresponding to the data channels punctured by the control channels may be set to a predetermined value such as '0'.

By using the data channels re-extracted as described above, the data packet is decoded and is completely received.

The control channels, the control indication channel, and the data channels, which are transmitted as described above, are restored by a mobile station, and thus, the transmission of the packet data is completed.

Figure 4:
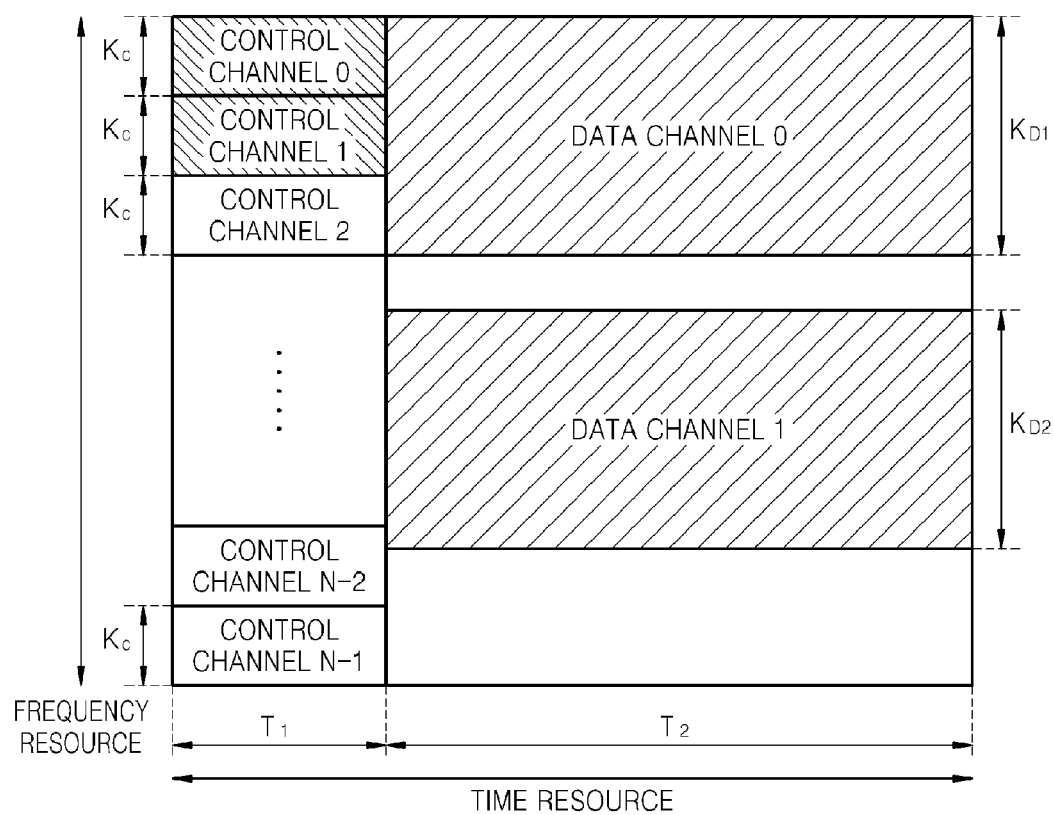
FIG. 4 is a diagram of a resource allocation map based on conventional transmission of control channels and data channels in an orthogonal frequency-division multiplexing (OFDM) system.

FIG. 4 is a diagram of a resource allocation map based on conventional transmission of control channels and data channels in an OFDM system.

Referring to FIG. 4, control channels 0 through N−1 are allocated to resources corresponding to a period of time $T_1$. This block of the period of time $T_1$, which is allocated with the control channels 0 through N−1, is not used for data channels.

Accordingly, the data channels are allocated to resources corresponding to a period of time $T_2$.

FIG. 4 illustrates an example when two control channels and two downlink data channels are transmitted. The control channels 0 and 1 are transmitted and the control channels 2 through N−1 are not transmitted. However, fixed resources allocation was used for the control channels 0 through N−1 and thus the resources may not be used for data channels. Therefore, data may not be transmitted at the period of time $T_1$ and a data rate is low.

Figure 5A:
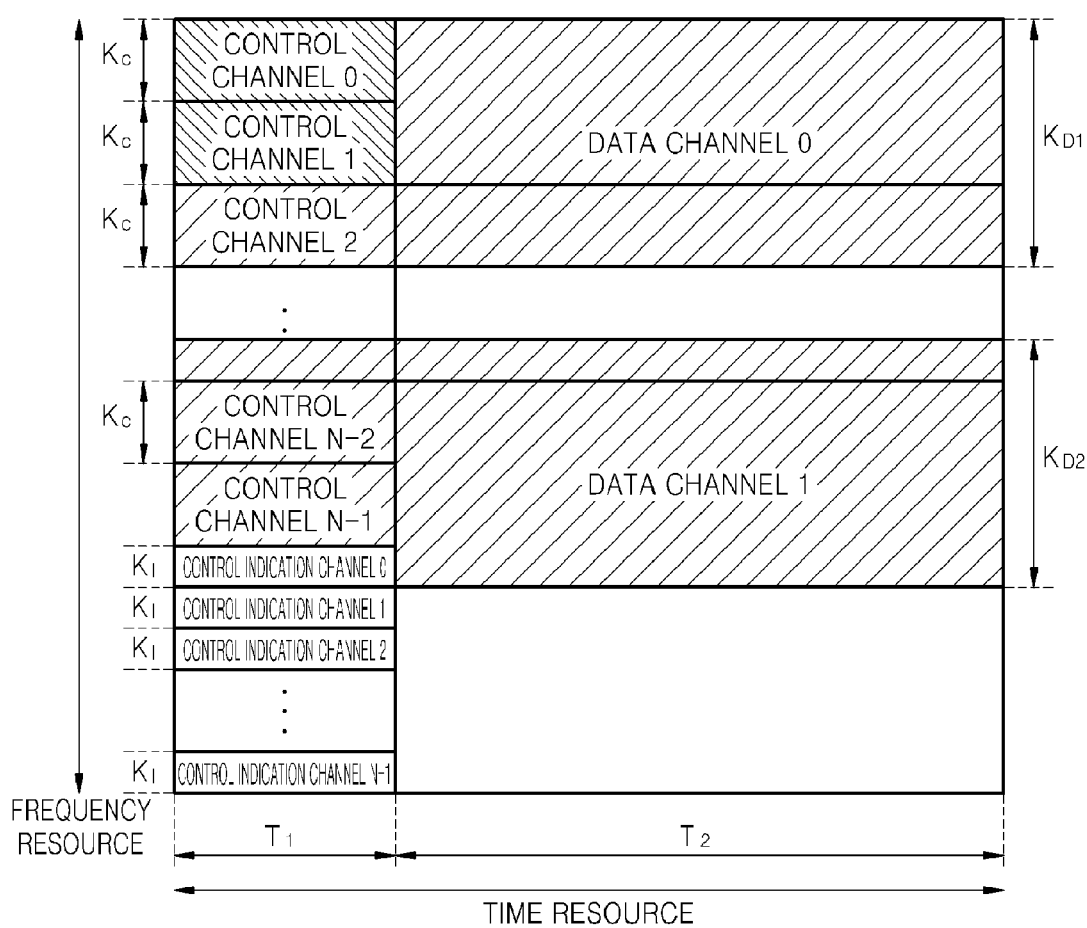
FIG. 5A is a diagram of a resource allocation map of control channels, control indication channel, and data channels in an OFDM system, according to an embodiment of the present invention.

FIG. 5A is a diagram of a resource allocation map of control channels 0 through N−1, control indication channel, and data channels 0 and 1 in an OFDM system, according to an embodiment of the present invention.

Referring to FIG. 5A, the control indication channel is added to the resource allocation map illustrated in FIG. 4. The control channels 2 through N−1, which are not transmitted, may be unrestrictedly used for the data channels and thus a data rate may be improved.

In more detail, the control indication channel, allocated to a period of time $T_1$, are set to be 'ACTIVE' for the control channels 0 and 1 and are set to be 'INACTIVE' for the control channels 2 through N−1. In general, frequency resources NxKi of the control indication channel is much less than frequency resources NxKc of the control channels 0 through N−1 and thus the data rate is improved by allocating fixed resources to the control indication channel and using the control channels 0 through N−1 only when required.

Figure 5B:
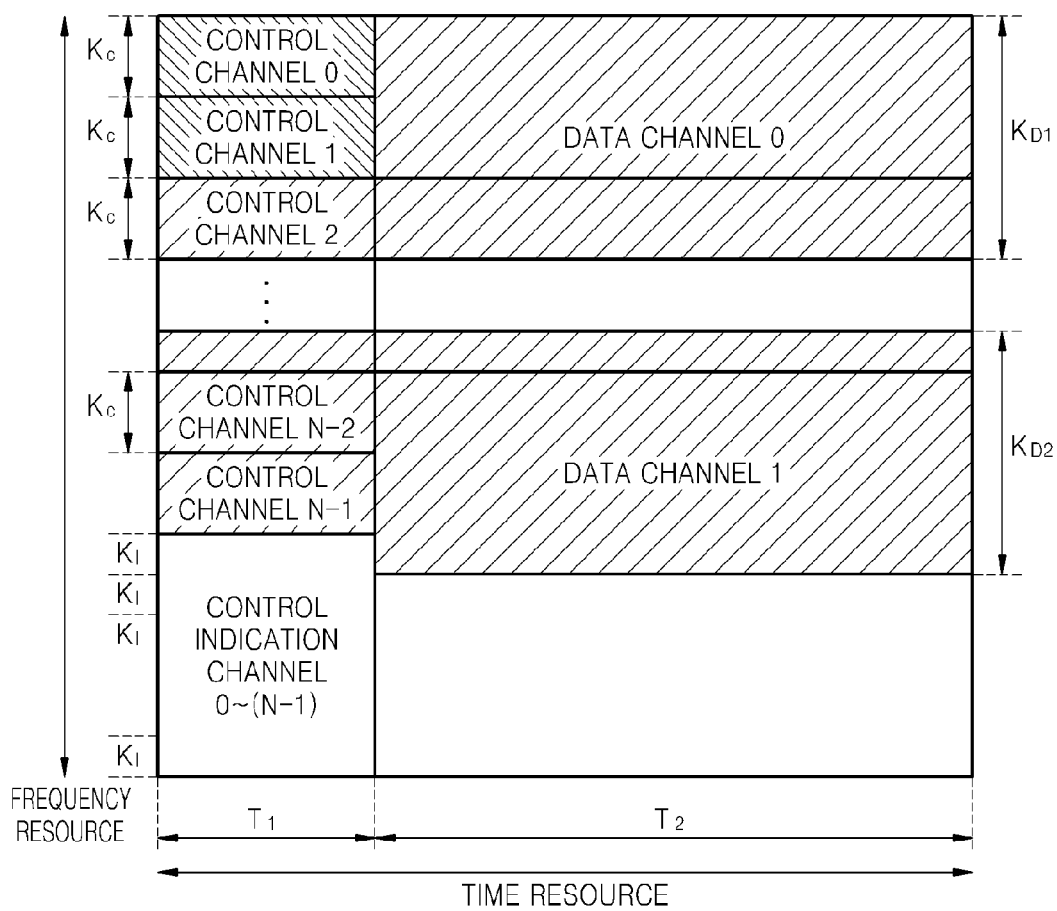
FIG. 5B is a diagram of a resource allocation map of control channels, control indication channel, and data channels in an OFDM system, according to another embodiment of the present invention.

FIG. 5B is a diagram of a resource allocation map of control channels 0 through N−1, control indication channel, and data channels 0 and 1 in an OFDM system, according to another embodiment of the present invention.

Referring to FIG. 5B, the control indication channel is not separated corresponding to the control channels 0 through N−1 according to frequency resources. Instead, the control indication channel is allocated to common frequency resources and is prevented from being temporarily transmitted for certain frequency resources. Thus, the reception performance of the data channels 0 and 1 may be improved.

Figure 5C:
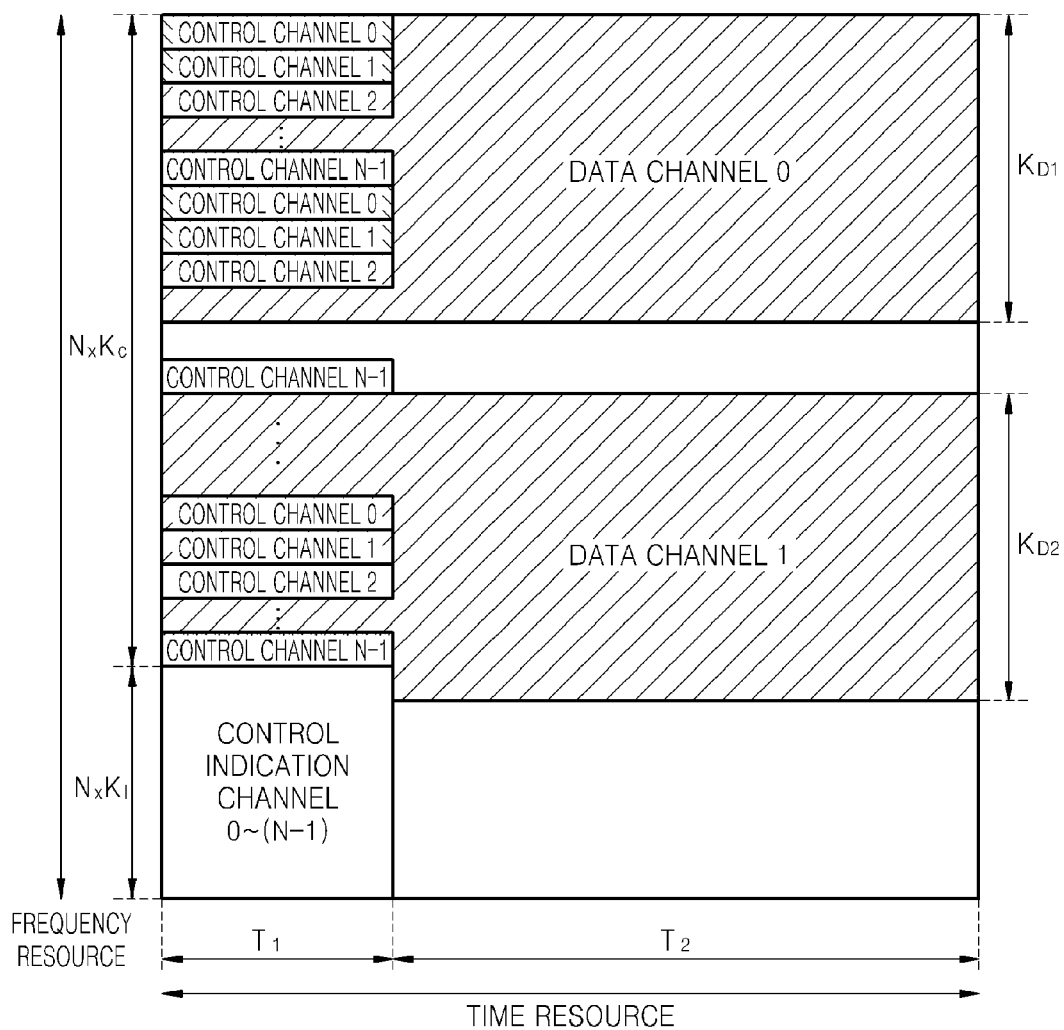
FIG. 5C is a diagram of a resource allocation map of control channels, control indication channel, and data channels in an OFDM system, according to another embodiment of the present invention.

FIG. 5C is a diagram of a resource allocation map of control channels 0 through N−1, control indication channel, and data channels 0 and 1 in an OFDM system, according to another embodiment of the present invention.

Referring to FIG. 5C, frequency resources of the control channels 0 through N−1 are allocated to be separate from frequency resources. However the control channels 0 through N−1 are sequentially allocated according to the frequency resources in the resource allocation map illustrated in FIG. 5B. As a result, frequency diversity may be maximized. In particular, if optimized frequency resources for the control channels 0 through N−1 cannot be organically allocated, it is more preferable to maximize the frequency diversity.

Figure 6:
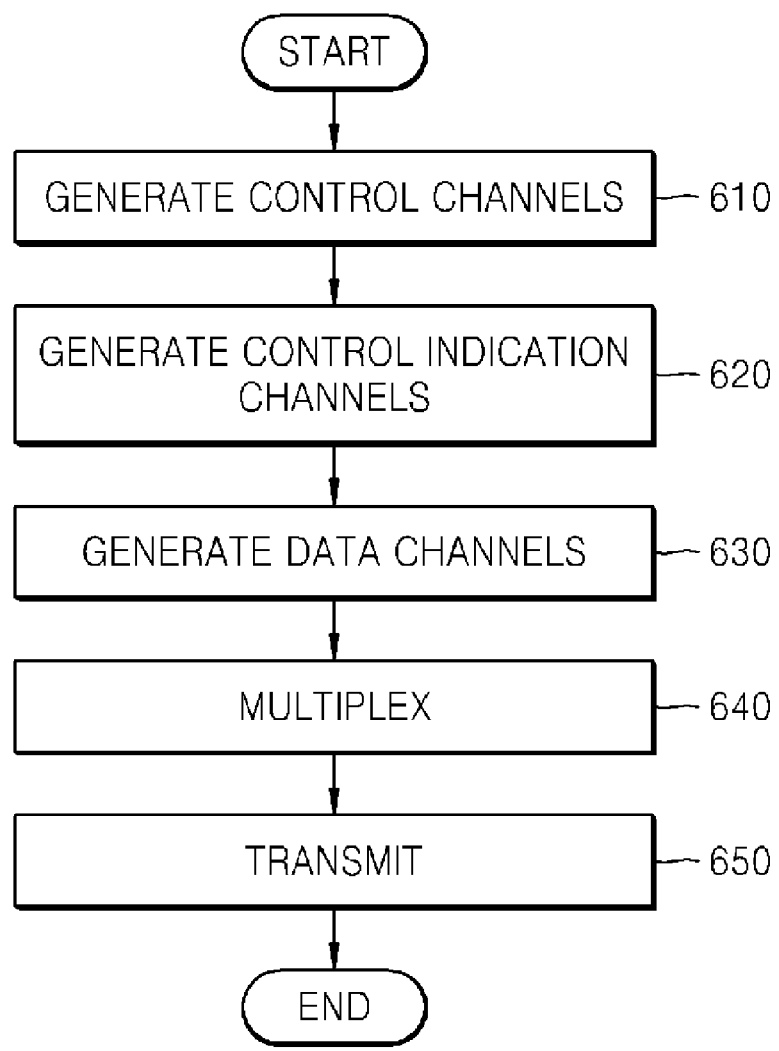
FIG. 6 is a flowchart of a method of transmitting control information and packet data by adopting control indication channel, according to an embodiment of the present invention.

FIG. 6 is a flowchart of a method of transmitting control information and packet data by adopting control indication channel, according to an embodiment of the present invention.

Referring to FIG. 6, in operation 610, a transmission device generates control channels in order to transmit the control information. Here, the control channels corresponding to data channels may be generated. In this case, if the control information to be transmitted does not exist, the control channels are not transmitted.

Then, in operation 620, control indication channel is generated. The control indication channel notifies a reception device of a fact of whether the control channels are transmitted or not by detecting which value is set to each control indication information bit. In this case, the fact of whether the control channels are transmitted or not may be notified by using a binary format. Any binary format such as 'ACTIVE' and 'INACTIVE', or '1' and '0', which are described above, may be used to notify. By generating and using the control indication channel, the control channels and resources may be efficiently managed.

The control indication channel may be generated by concatenating each control indication information bit such that each control indication information bit indicates whether each control channel is transmitted or not. In this case, the control indication channel will be allocated to fixed resources.

In operation 630, data channels, for transmitting the packet data, are generated. The packet data will be transmitted based on the control information. In order to utilize a maximum of the packet data, information regarding resources for transmitting the data channels needs to be obtained in advance. Then, an amount of the packet data corresponding to the number of the resources is generated. Accordingly, the resources may be efficiently used.

Here, according to an embodiment of the present invention, the amount of the packet data corresponding to the number of the resources allocated to predetermined data channels is generated and an amount of the packet data which is not actually transmitted due to the control channels may be excluded from being multiplexed by marking an additional indication such as 'x', which is not a binary indication such as '1' and '0'.

In more detail, N packet data bits are generated by using binary numbers '1' and '0'. M packet data bits that are not transmitted due to the control channels from among the N packet data bits. The M packet data bits from among the N packet data bits is set to be, for example, 'x'. The number of packet data bits that is actually transmitted is N−M and thus the packet data set to be '0', '1', and 'x' is allocated in accordance with a predetermined rule. In this case, when signals corresponding to '0' or '1' are input, resources are normally allocated. When signals corresponding to 'x' are input, the signals corresponding to 'x' are excluded from being modulated. The signals corresponding to 'x', which indicate not to allocate the resources, are referred to as discontinuous transmit (DTX) bits.

In operation 640, the control channels, the control indication channel, and the data channels are multiplexed.

The information regarding the resources for transmitting the data channels may be obtained in advance, then the amount of the packet data corresponding to the number of the resources may be generated, and the packet data that is not transmitted due to the control channels may be excluded from being modulated by marking the additional indication.

According to an embodiment of the present invention, the resources of the control channels that are not transmitted may be used for the data channels in order to efficiently use the resources.

The control channels and the control indication channel may be allocated to fixed resources. However, the control channels and the control indication channel may also be arbitrarily allocated to frequency resources for frequency diversity.

In operation 650, the control channels, the control indication channel, and the data channels are transmitted so as to completely transmit the control information and the packet data.

Figure 7:
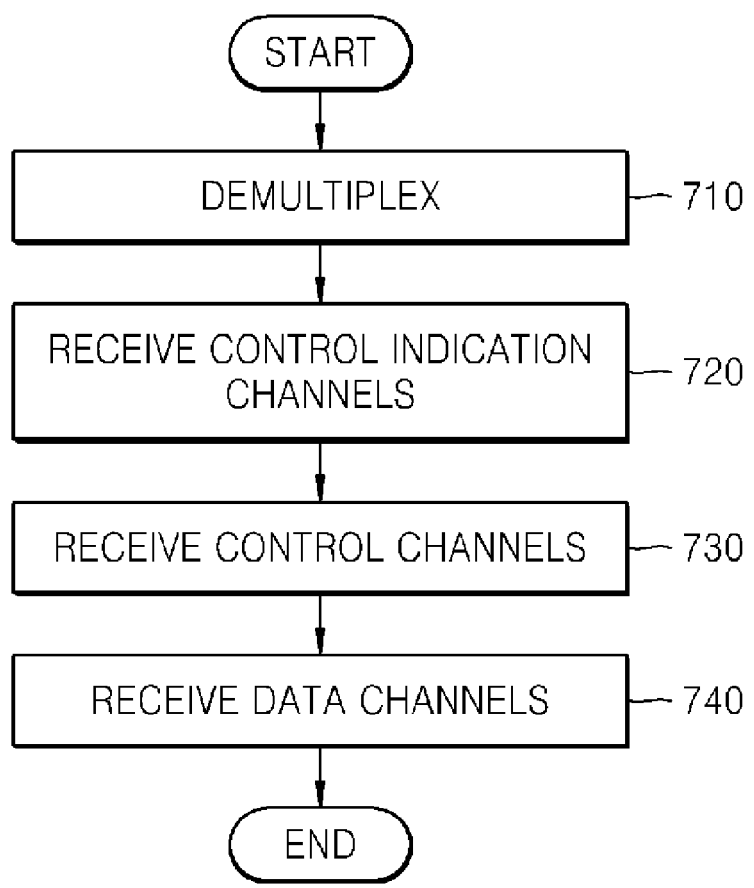
FIG. 7 is a flowchart of a method of receiving control information and packet data by adopting control indication channel, according to an embodiment of the present invention.

FIG. 7 is a flowchart of a method of receiving control information and packet data by adopting control indication channel, according to an embodiment of the present invention.

Referring to FIG. 7, in operation 710, a reception device separates corresponding channel signals from resources designated for one or more channels by demultiplexing the received signal.

In more detail, firstly, the control indication channel is demultiplexed by using information regarding resources allocated to the control indication channel, then control channels are demultiplexed by using information regarding resources allocated to the control channels regardless of a fact of whether the control channels are transmitted or not, and data channels are demultiplexed by using information regarding all resources allocated to the data channels regardless of a fact of whether the data channels are duplicated with other channels or not. Then, in operation 720, the reception device receives the control indication channels after operation 710 is performed. In this case, the reception device attempts to detect all available control indication information bits.

In operation 730, the reception device receives the control channels by using information of the received control indication channels. That is, the reception device attempts to receive only control channels determined as being transmitted by detecting the control indication channel. In operation 740, the reception device receives the data channels by using information of the received control indication channel and control channels.

In more detail, firstly, control information regarding transmitted resources for the data channels is obtained by using the detected control indication information bits. Then, the transmitted resources are re-extracted in accordance with the control indication information. If the data channels are multiplexed so as to use different resources from the resources used by control channels, the re-extracting of the transmitted resources may be performed only by collecting information corresponding to resources of the data channels. Alternatively, if the data channels are multiplexed so as to be punctured by other channels, the re-extracting of the transmitted resources may be performed by collecting resources of the data channels and resources of the control channels puncturing the data channels and setting data corresponding to the data channels punctured by the control channels may be set to a predetermined value such as '0'.

While the present invention has been particularly shown and described with reference to exemplary embodiments thereof, it will be understood by one of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

The invention claimed is:

1. A method of transmitting control information and packet data, the method comprising:
   (a) generating control channels which transmit the control information;
   (b) generating control indication channel which indicates whether the control channels are transmitted or not;
   (c) generating data channels in order to transmit the packet data based on the control information;
   (d) multiplexing the control channels, the control indication channels, and the data channels; and
   (e) transmitting the control channels, the control indication channels, and the data channels.

2. The method of claim 1, wherein (a) comprises transmitting only the control channels having the control information to be transmitted.

3. The method of claim 1, wherein (b) comprises generating the control indication channels corresponding to the control channels.

4. The method of claim 1, wherein (b) comprises notifying a mobile station of a fact of whether the control channels are transmitted or not by using a binary format.

5. The method of claim 1, wherein, in (b), the control indication channels use common frequency resources and are separated into identified sequences.

6. The method of claim 5, wherein the sequences allocated to the control indication channels are orthogonal.

7. The method of claim 1, wherein (c) comprises obtaining information regarding resources for transmitting the data channels in advance and then generating an amount of the packet data corresponding to the number of the resources.

8. The method of claim 1, wherein (c) comprises obtaining information regarding resources for transmitting the data channels in advance, then generating an amount of the packet data corresponding to the number of the resources, and excluding an amount of the packet data, which is not actually transmitted due to the control channels, from being multiplexed by marking an additional indication.

9. The method of claim 1, wherein (d) comprises multiplexing the control channels, the control indication channels, and the data channels so as to enable using resources of the control channels not to be transmitted to transmit the data channels.

10. The method of claim 1, wherein, in (d), the control channels and the control indication channels are arbitrarily allocated to frequency resources for diversities among frequency resources.

11. An apparatus for transmitting control information and packet data, the apparatus comprising:
   a control channel generation unit for generating control channels which transmit the control information;
   a control indication channel generation unit for generating control indication channels which indicate whether the control channels are transmitted or not;
   a data channel generation unit for generating data channels;
   a multiplexing unit for receiving channel signals of the control channels, the control indication channels, and the data channels and multiplexing the channel signals;
   a channel transmission unit for receiving the multiplexed channel signals and outputting the multiplexed channel signals as an output signal; and
   a transmission control unit for receiving a control signal from an external device and controlling the control channel generation unit, the control indication channel generation unit, the data channel generation unit, the multiplexing unit, and the channel transmission unit.

12. The apparatus of claim 11, wherein the control channel generation unit transmits only the control channels having the control information to be transmitted.

13. The apparatus of claim 11, wherein the control channel generation unit generates the control indication channels corresponding to the control channels.

14. The apparatus of claim 11, wherein the control indication channels use common frequency resources and are separated into identified sequences.

15. The apparatus of claim 14, wherein the sequences are orthogonal.

16. The apparatus of claim 11, wherein the data channel generation unit obtains information regarding resources for transmitting the data channels in advance and then generates an amount of the packet data corresponding to the number of the resources.

17. The apparatus of claim 11, wherein the data channel generation unit obtains information regarding resources for transmitting the data channels in advance, then generates an amount of the packet data corresponding to the number of the resources, and excludes an amount of the packet data, which is not actually transmitted due to the control channels, from being multiplexed by marking an additional indication.

18. A method of receiving control information and packet data, the method comprising:
   (a) separating corresponding channel information from resources designated for one or more channels by demultiplexing the channel information;
   (b) receiving control indication channels in accordance with the result of demultiplexing;
   (c) receiving control channels by using information of the received control indication channels; and
   (d) receiving data channels by using information of the received control indication channels and control channels.

19. The method of claim 18, wherein (a) comprises:
   (a1) demultiplexing the control indication channels by using information regarding resources allocated to the control indication channels;
   (a2) demultiplexing the control channels by using information regarding resources allocated to the control channels regardless of a fact of whether the control channels are transmitted or not; and
   (a3) demultiplexing the data channels by using information regarding all resources allocated to the data channels regardless of a fact of whether the data channels are duplicated with other channels or not.

20. The method of claim 18, wherein (b) comprises detecting all available control indication channels.

21. The method of claim 20, wherein (c) comprises detecting only control channels determined as being transmitted in accordance with the result of detecting the control indication channels.

22. The method of claim 18, wherein (d) comprises:
   (d1) obtaining information regarding resources for transmitting the data channels by using the result of receiving the control indication channels; and
   (d2) re-extracting transmitted resources are re-extracted in accordance with the obtained information.

23. The method of claim 22, wherein, if the data channels are multiplexed so as to use different resources from the resources used by other channels, the re-extracting of the transmitted resources is performed by collecting information corresponding to resources of the data channels.

24. The method of claim 22, wherein, if the data channels are multiplexed so as to be punctured by other channels, the re-extracting of the transmitted resources is performed by collecting resources of the data channels and resources of the other channels puncturing the data channels and setting the resources of the other channels to be arbitrarily determined values.

* * * * *